Aug. 5, 1924.
W. E. DEWEY
1,503,579
SYRINGE
Filed April 30, 1920
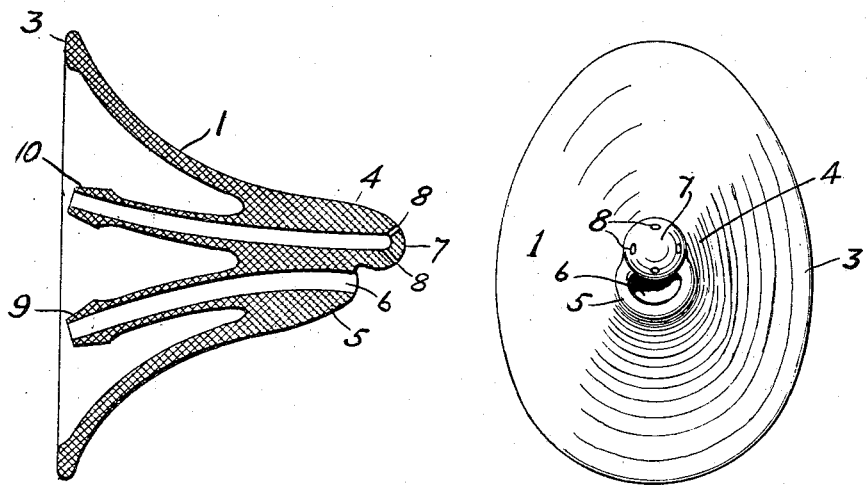
FIG.1.                     FIG.2.
WITNESS:
INVENTOR
Walter E. Dewey
BY
ATTORNEY.

Patented Aug. 5, 1924.

1,503,579

UNITED STATES PATENT OFFICE.

WALTER E. DEWEY, OF GLENSIDE, PENNSYLVANIA.

SYRINGE.

Application filed April 30, 1920. Serial No. 377,785.

*To all whom it may concern:*

Be it known that I, WALTER E. DEWEY, a citizen of the United States, and a resident of Glenside, in the county of Montgomery and State of Pennsylvania, have invented certain new and useful Improvements in Syringes, of which the following is a description.

The present invention relates to vaginal syringes of the plug type, and its principal objects are first, to provide for keeping cool the parts of the syringe which should be kept cool when a hot douche is used; second, to provide a sanitary device which can be thoroughly cleaned and sterilized, if desired; and third, to protect the pipes, constituting connections for tubing, from breakage. Other objects of the invention, including economy of manufacture, the absence of joints, and the lack of necessity for adjusting the parts, will appear from the following description.

The invention will be claimed at the end hereof, but will be first described in connection with the accompanying drawings, forming part hereof, and in which Figure 1, is a sectional view of a device embodying a form of the invention, and Figure 2, is a front view of the same.

In the drawings 1, is a hollow conoidal shell, in the present instance shown as having externally concave walls and an elliptical or oval rim 3. At its base this shell 1, is open for the free access of the air which exerts a cooling effect hereinafter referred to. At the apex or generally pointed end 4 of this open based hollow body there are shown lobes or projections of which one 5, is provided with an outflow opening or channel 6 and of which the other 7, shields the first, or more accurately the opening or channel 6 therein, and is provided with inflow openings 8 of which the number may be increased or diminished. The lobes are convenient in providing the inflow and outflow openings, but they are not necessary in all cases. The apex 4, is internally provided with outflow and inflow pipes 9 and 10, spaced from the shell-wall and extending axially of the shell (the open back thereof). As shown these pipes terminate short of the shell of the hollow open-backed body. These pipes 9 and 10, constitute connections for tubing, not shown because too well understood to require illustration. The fact that the inflow and outflow pipes 10 and 9 are spaced from the shell-wall opposes the transfer of heat to the portions of the latter that should be kept cool.

In the use of the described syringe with hot douches, for its intended purpose, the outer portions of the vagina are protected from the discomfort of extreme temperatures by reason of the open air space or chamber around the pipes 9 and 10 and within the shell 1. Inasmuch as the described syringe is unitary, or consists of one piece, it follows that there can be no trouble such as is encountered from leaky joints or unsanitary washers or packings of soft rubber or other material. Again no adjustment or assembly of parts is required and the device can be sterilized by boiling, since consequent warping of its parts, if any occurs, does not interfere with its efficiency or usefulness. Since the construction and form are such that the device can be made of rubber or like material in one piece, it follows that the cost of manufacture is relatively small. Inasmuch as the pipes 9 and 10, are integral with the reinforcement at the apex and are protected by the shell, it follows that they are not subject or exposed to breakage.

It will be obvious to those skilled in the art that modifications may be made in details of construction and arrangement without departing from the spirit of the invention which is not limited as to those matters or otherwise than as the prior art and the appended claims may require.

I claim:

1. A unitary or one-piece syringe of the type specified comprising an open-backed air cooled hollow conoidal shell terminating at its apex in inflow and outflow openings provided integrally with inflow and outflow pipes spaced from each other and from the shell-wall and extending towards and terminating short of the base, substantially as described.

2. A unitary or one-piece syringe of the class specified comprising a hollow conoidal shell having externally concave walls and an elliptical rim at its open base and having at its apex lobes of which one is provided with an outflow opening and of which the other shields the first and is provided with inflow openings, and said apex provided integrally with outflow and inflow pipes spaced from each other and from the shell-wall and extending towards and terminating short of the base rim, substantially as described.

WALTER E. DEWEY.